United States Patent [19]

Takasugi et al.

[11] 4,382,172
[45] May 3, 1983

[54] METHOD FOR FABRICATING A WATCH CASE

[75] Inventors: Tsuneji Takasugi; Seiji Umezawa, both of Tanashi, Japan

[73] Assignee: Citizen Watch Co., Ltd., Tokyo, Japan

[21] Appl. No.: 255,111

[22] Filed: Apr. 17, 1981

[30] Foreign Application Priority Data

Apr. 22, 1980 [JP] Japan .............................. 55-54918[U]

[51] Int. Cl.³ ........................... B23K 9/02; B23K 9/04
[52] U.S. Cl. ........................ 219/137 R; 219/85 CM; 219/93; 228/175; 228/214; 368/276; 368/294
[58] Field of Search ............... 368/276, 294, 295, 296; 228/175, 214; 219/85 CM, 93, 118, 137 R

[56] References Cited

U.S. PATENT DOCUMENTS 2,625,450  1/1953  Ringsmith ............................ 219/93
3,156,086  9/1961  Egger ............................. 368/295 X Primary Examiner—J. V. Truhe
Assistant Examiner—T. L. Flower
Attorney, Agent, or Firm—Koda and Androlia

[57] ABSTRACT

A method for fabricating a watch case comprising the steps of placing contact points of a bezel and a watch body to face to each other, applying pressure to said contact points through electrodes, and applying pulse current to said electrodes until said contact points get molten. The pulse current will allow the bezel and the body except the contact points to cool down during its intervals. Therefore, this method does not require a water-cooling system as required by conventional methods.

7 Claims, 5 Drawing Figures

METHOD FOR FABRICATING A WATCH CASE

BACKGROUND OF THE INVENTION

1. Field of the Invention

This invention relates to a method for fabricating a watch case and more particularly to a method for uniting a bezel with a watch body.

2. Prior Art

There have been known a number of methods of fabricating a watch case. Those methods may use adhesives, snap fastening or synthetic resin and the like. A choice among those methods is made based on the type of a watch to best suit its demand. Therefore, each one of those methods has been used to an extent. However, close examination of the above-mentioned methods shows that they fail in some respects to meet the demands created by the recent diversification of design in the watch case typically with a thinner dimension. Specifically, since adhesives are suited to fasten two parts together in a small space, a method using adhesives appears to satisfy the present day demands. However, since the parts are fastened together in a small space, the adhesive joining must be carefully performed in order to guarantee the air-tight integrity of the watch case. If this is neglected, it may not be possible to obtain a sufficient adhesive force, not to mention the fact that the water resistance of the watch case is damaged. Snap fastening structures are widely used for fastening watch case backs. Because of difficulties in finishing the parts with a snap fastener, however, the variation of design is limited. As a result of recent advances in finishing techniques, methods in which synthetic resin is pressure injected are now used widely in thin watch cases and watch cases of unique design. However, this method still has not completely satisfied the present demands created by the thin type and diversification of watch case designs.

SUMMARY OF THE INVENTION

Accordingly, it is the primary object of this invention to provide a method for fabricating a watch case which allows a more variety of design without sacrificing the quality.

In keeping with the principles of the present invention, the object is accomplished by a unique method for fabricating a watch case wherein the joint surfaces of the bezel and watch body wherein the joint surfaces of the bezel and watch body, one of which has a projection on its joint surface, are racing each other and said two parts are joined by way of said projection which is melt by pulse current applied thereto.

BRIEF DESCRIPTION OF THE DRAWINGS

The above-mentioned features and objects of the present invention will become more apparent by reference to the following description taken in conjunction with the accompanying drawings wherein like reference numerals denote like elements and in which.

DETAILED DESCRIPTION OF THE INVENTION

Figure 1:
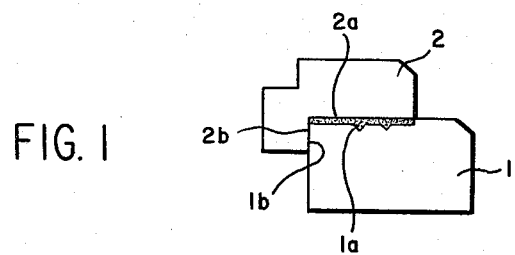
FIG. 1 is a partial cross-sectional view of a bezel and a watch body in accordance with the teachings of this invention.
Figure 4:
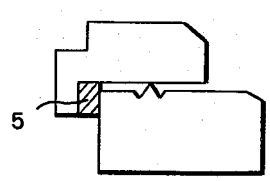
FIGS. 4 and 5 are partial cross-sectional views of a bezel and a watch body illustrating another embodiment of this invention.

Referring more particularly to the drawings, in FIG. 1 a watch body 1 and bezel 2 are assembled via their respective joint surfaces 1a and 2a and guide surfaces 1b and 2b. The joint surfaces are joined by projection welding using pulse current. Furthermore, the positional relationship of the watch body 1 and bezel is maintained by the guide surfaces 1b and 2b. Instead of forming guide surfaces on the watch body 1 and bezel 2, it would also be possible to insert a guide ring 5 between the watch body 1 and bezel 2 as shown in FIG. 4.

Figure 2:
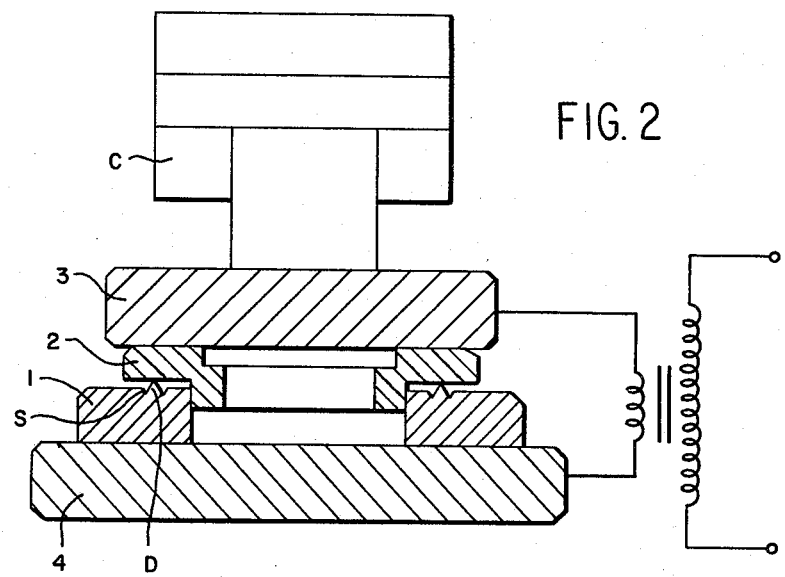
FIG. 2 is a cross-sectional view, including a schematic diagram of a circuit, which illustrates the method of this invention.

In FIG. 2, a projection D and depression S are formed around the entire circumference of the watch body 1. These depressions S receive molten metal of the projection D which is molten by resistance welding and thus prevents the flow of said molten metal away from the joint area. It would also be possible to form the projection D and depression S on the bezel 2 instead of on the watch body 1.

Figure 3:
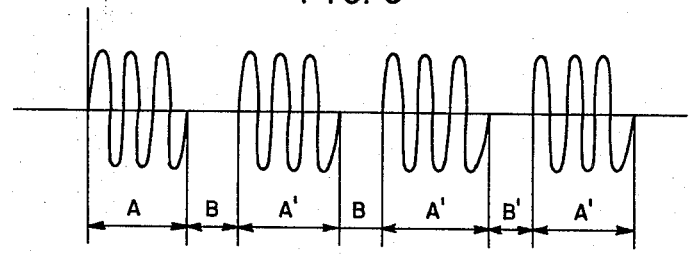
FIG. 3 is a waveform diagram of pulse current.

The watch body 1 and bezel 2 are placed between electrodes 3 and 4. Pressure is applied by means of said electrodes 3 and 4 by a pressure-applying cylinder C, and an electric current is passed through the watch body 1 and bezel 2. In this case, the electric current should be pulse current in which periods of current flow alternate with cooling periods during which no current flows, as is shown in FIG. 3, wherein the reference labels A, A' show the periods of current flow; B, B' periods of no current flow. As can be seen from the FIG. 3, the adequate ratio of periods of time in which current flows and no current flows is 2:1 or 3:1.

The use of a pulse current causes the following process to occur: During the initial state of current flow A, the projection D on the watch body 1 and the minute portion of the joint surface 2a of the bezel 2 that is initially in contact with said projection D, are heated to a high temperature so that a molten area is formed. Next, when the current flow is stopped so that heating is interrupted, as indicated by B in FIG. 3, and then started again, as indicated by A' in FIG. 3, the portions of the joint surface 2a of the bezel 2 and the projection D of the watch body 1 that are now in contact are heated to a high temperature so that the molten area is broadened. Repeating the above process causes the molten area to extend around the entire contact surface between the bezel 2 and the projection D on the watch body 1. As a result, it is possible to obtain a joint which has a strong holding power and which is superior in terms of air-tight integrity.

Figure 5:
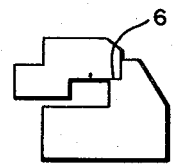

FIG. 5 illustrates another embodiment of the invention, where a narrow joint surface 6 is formed instead of a projection as shown in the above-mentioned embodiment, and the same effect is obtained.

As described above, the method for fabricating a watch case provided by this invention makes it possible to weld the entire circumference of a watch case by heating only the joint surfaces to a high temperature without heating the other parts to a high temperature. This is a special feature obtained by using a pulse current in projection welding. That is, the pulse current has pauses when it flows, therefore not only the electrodes but also the bezel and the watch body can be cooled during said pauses. When the pulse current flows again before the projection is completely cooled, the welding portion of the projection is reheated and molten to unite the bezel with the watch body. Accordingly, water used to cool the electrodes required in the conventional electric welding is not necessary.

Since the parts as a whole are not heated to a high temperature, the method of providing by this invention does not cause any surface changes such as oxidation, etc., and there is no heat-caused deformation. Accordingly, this method is extremely useful for making water-resistant joints between finished parts.

Moreover, this invention can facilitate surface finishing which is difficult to perform with the parts assembled as a single unit, and offers a wide range of design variations in shape, etc., in water-resistant structures.

In all cases it is understood that the above described embodiments are merely illustrative of but a few of the many possible specific embodiments which represent the applications of the principles of the present invention. Numerous and varied outer arrangements can be readily devised by those skilled in the art without departing from the spirit and scope of the present invention.

We claim:

1. A method for fabricating a watch case comprising the steps of:
   placing contact points of a bezel and a watch body to face each other;
   applying pressure to said bezel and watch body by means of electrodes; and
   applying pulse current including heating periods for heating said contact points and cooling periods for cooling said bezel and watch body of the heat transmitted from said contact points to said electrodes until said contact points get molten to form a joint.

2. A method for fabricating a watch case according to claim 1, wherein one of said contact points comprises at least one projection.

3. A method for fabricating a watch case according to claim 2, wherein at least one depression is provided near said projection to accommodate molten material from said projection.

4. A method for fabricating a watch case according to claim 2, wherein pressure is applied through a pressure cylinder.

5. A method for fabricating a watch case according to claim 2, wherein said heating periods are periods of current flow and in which said cooling periods are periods of no current flow.

6. A method for fabricating a watch case according to claim 2, wherein a ratio of said heating and cooling periods is 2:1.

7. A method for fabricating a watch case according to claim 2, wherein a ratio of said heating and cooling periods is 3:1.

* * * * *